(12) United States Patent
Doty

(10) Patent No.: US 6,587,078 B1
(45) Date of Patent: Jul. 1, 2003

(54) INTERFERENCE-AIDED NAVIGATION WITH TEMPORAL BEAM FORMING IN ROTATING VEHICLES

(75) Inventor: James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 10/123,947

(22) Filed: Apr. 17, 2002

(51) Int. Cl.[7] .............................. G01S 3/28; F42B 10/00
(52) U.S. Cl. ....................... 342/383; 244/3.1; 244/3.23
(58) Field of Search .................................. 342/378, 380, 342/382, 383; 244/3.1, 3.15, 3.19, 3.2, 3.23, 3.24; 701/207, 213, 214–226

(56) References Cited

U.S. PATENT DOCUMENTS

| | | | |
|---|---|---|---|
| 4,520,669 A | 6/1985 | Rider | 73/510 |
| 5,592,181 A * | 1/1997 | Cai et al. | 342/457 |
| 6,163,021 A | 12/2000 | Mickelson | 244/3.2 |
| 6,208,936 B1 | 3/2001 | Minor et al. | 701/220 |
| 6,520,448 B1 * | 2/2003 | Doty et al. | 244/3.23 |
| 2002/0169578 A1 * | 11/2002 | Yang | 702/152 |

OTHER PUBLICATIONS

Co-filed patent application Docket No. 02CR169/KE entitled "Interference–Aided Navigation System For Rotating Vehicles" filed on an even date, inventor J. Doty.

Co-pending patent application Docket No. 00CR163/KE entitled "Spinning—Vehicle Navigation Using Apparent Modulation Of Navigational Signals" filed on Jun. 12, 2001, Application No. 09/879,392, inventors J. Doty and G. McGraw.

Co-pending patent application Docket No. 01CR040/KE entitled "Low Cost Interference Reduction System For GPS Receivers" filed on Dec. 5, 2001, Application No. 10/005, 237, inventor Thomas V. DeWulf.

* cited by examiner

Primary Examiner—Dao Phan
(74) Attorney, Agent, or Firm—Nathan O. Jensen; Kyle Eppele

(57) ABSTRACT

An interference-aided signal acquisition and tracking system with temporal beam forming for a rotating vehicle enhances signal to noise ratio using interference or jamming signals. An antenna receives interference signals and desired navigation signals. A RF processing function connected to the antenna processes the received interference signals and the desired navigation signals into IF signals. An A/D converter connected to the RF processing function digitizes the interference signals and desired navigation signals and provides a digitized IF signal. A tracking filter tracks amplitude variations of the interference signals and provides a rotation angle estimate signal of the rotating vehicle. A signal modulation function connected to the tracking filter and the A/D converter varies gain of the IF signal to enhance the signal to noise ratio.

22 Claims, 19 Drawing Sheets

INTERFERENCE-AIDED NAVIGATION WITH TEMPORAL BEAM FORMING IN ROTATING VEHICLES

CROSS REFERENCE

Related application SPINNING VEHICLE NAVIGATION USING APPARENT MODULATION OF NAVIGATIONAL SIGNALS by James H. Doty and Gary McGraw filed Jun. 12, 2001, Ser. No. 09/879,392 is hereby incorporated by reference. Related application co-filed application INTERFERENCE-AIDED NAVIGATION SYSTEM FOR ROTATING VEHICLES by James H. Doty, Ser. No. 10/123,928, filed Apr. 17, 2002 is hereby incorporated by reference. Related application LOW COST INTERFERENCE REDUCTION SYSTEM FOR GPS RECEIVERS by Thomas V. DeWulf filed Dec. 5, 2001, Ser. No. 10/005,237, is hereby incorporated by reference.

BACKGROUND OF THE INVENTION

This invention relates to guidance of rotating vehicles, GPS guidance of artillery shells, and more specifically interference-aided navigation and temporal beam forming using interference signals.

Spinning vehicles such as artillery shells, missiles, bombs, and uninhabited aerial vehicles (UAV) are using navigation and guidance techniques to accurately reach their designated targets. Techniques in use include inertial navigation, global positioning system (GPS) guidance, and magnetic field sensing.

In many applications, such as artillery shell or missile guidance, the vehicle to be guided is spinning rapidly. The small size and high rotation rate of the vehicle greatly complicate traditional navigation enhancement techniques such as inertial aiding and multi-antenna beam forming as disclosed in co-pending application 01CR040/KE Ser. No. 10/005,237 filed Dec. 5, 2001. The small size of an artillery shell or fuse does not permit the use of large antenna arrays or complex RF electronics. Inertial navigation is very difficult to implement because even very small scale factor errors and instabilities lead to large and rapidly increasing attitude errors. For example, a shell spinning at 250 Hz is turning at 90,000°/s. A scale factor error of only 11 ppm will cause an attitude error rate of 1°/s. The small gyros that could be packaged into an artillery round or fuse do not have the precision to maintain an accurate attitude estimate at these rotation rates. Traditionally, guided shell designers have been forced to resort to mechanical de-spinning systems that add cost, size, and complexity. Shells that are not de-spun have utilized omnidirectional antennas with limited jamming immunity for GPS signal reception, and no inertial aiding.

U.S. Pat. No. 6,208,936 describes some of the difficulties encountered in creating an effective navigation system for a rapidly spinning vehicle such as an artillery shell. A system is disclosed that utilizes a magnetic field sensor for tracking the rotation angle of the vehicle and a system for computationally de-spinning the vehicle to greatly simplify calculation and improve accuracy of the navigation solution. U.S. Pat. No. 6,163,021 also discloses utilizing a magnetic field sensor to de-spin the body-axis frame measurements and, in addition, using accelerometers to measure the Coriolis accelerations due to rotation. The need for gyros and their associated rate range and scale factor limitations is eliminated. The technique of utilizing accelerometers to measure rotation rate, in a spinning frame, is well known and disclosed in U.S. Pat. No. 4,520,669.

Use of a magnetic sensor for roll determination in a spinning vehicle can be effective under the correct circumstances. However, this approach requires the addition of a magnetic sensor and performance can be dependent on the magnetic properties of the vehicle and its electrical systems as well as its position on the earth and the magnetic environment. For example, near the equator a vehicle traveling approximately due north or south will have difficulty in determining its rotation angle.

Cited co-pending application Ser. No. 09/879,392 filed Jun. 12, 2001 describes an advanced spinning-vehicle navigation (AVSN) system utilizing GPS or similar navigation signals to determine the rotation angle of the vehicle. This approach offers significant improvement in performance and robustness under interference once the navigation signals are acquired. However, the application does not describe any technique to enhance initial acquisition under high levels of jamming or interference.

Artillery navigation systems have utilized omnidirectional antennas to reduce the phase and amplitude modulation as a function of projectile roll angle. This approach has poor performance under conditions of interference and jamming because the GPS signal and interference source are continuously received at the same relative gain. The use of a directional antenna will tend to improve interference immunity because the GPS receiver's AGC control will tend to reduce gain when the antenna is pointed toward the jamming source, and tend to increase the gain when the antenna is pointed away from the interference. Unfortunately the directional antennas tend to produce large phase modulations with rotation, and performance is not fully optimized because the received signal is still being processed during the times when the antenna is pointed toward the jammer and signal to noise ratios may be close to zero.

The phase and amplitude modulation, combined with any external interference and jamming signal sources can make it difficult to acquire and track low-level navigation signals such as GPS. A practical, cost-effective, technique is needed for spinning vehicles to acquire and track low-level signals in the presence of large interference or jamming signals.

SUMMARY OF THE INVENTION

An interference-aided signal acquisition and tracking system with temporal beam forming for a rotating vehicle to enhance signal to noise ratio is disclosed. The system includes an antenna that receives interference signals and desired navigation signals. A RF processing function connected to the antenna processes the received interference signals and the desired navigation signals into IF signals. An A/D converter connected to the RF processing function digitizes the interference signals and desired navigation signals to provide a digitized IF signal. A tracking filter tracks amplitude variations of the interference signals and provides a rotation angle estimate signal of the rotating vehicle. A signal amplitude modulation function connected to the tracking filter and the A/D converter varies the gain of the IF signal to enhance the signal to noise ratio.

An intensity detector connected to the RF processing function and the tracking filter may be used for determining the level of the interfering signal and for providing an input modulation signal to the tracking filter. An AGC loop connected to the A/D converter and to the tracking filter may provide an input modulation signal to the tracking filter.

The tracking filter may further comprise a first mixer for receiving the input modulation signal from the AGC loop and mixing the input modulation signal with a first demodulation signal. A first filter in the tracking filter amplifies and filters the first mixer output signal to provide a phase error feedback signal. A tracking servo receives the phase error feedback signal, provides the first demodulation signal and provides the rotation angle estimate signal.

The signal amplitude modulation function comprises a signal modulation controller that receives the rotational angle estimate from the tracking filter and provides a modulation control signal. A gain modulation function increases gain when the antenna is pointed toward a navigation signal source and reduces gain when the antenna is pointed toward an interfering signal source to enhance signal to noise ratio.

The interference-aided signal acquisition and tracking system for a rotating vehicle may further comprise a second antenna for receiving interference signals and desired navigation signals, a second RF processing function connected to the second antenna to process the received interference signals and the desired navigation signals and for cross-feeding signals to the first RF processing function, and a second A/D converter connected to the second RF processing function to digitize the interference signals and desired navigation signals and to provide a second IF signal to further enhance performance.

It is an object of the present invention to provide acquisition of navigation and other signals in spinning vehicles.

It is an object of the present invention to provide a system that acquires and tracks low-level signals in the presence of large interference and jamming signals.

It is a feature of the present inventions to utilize the amplitude modulation of any present interference signal to aid in the determination of vehicle rotation rate to aid in the acquisition of navigation and other signals.

It is a feature of the present invention obtain roll angle estimates using interference or jamming signals from an interference tracking loop to improve signal to noise ratios.

It is an advantage of the present invention to provide significant signal to noise ratio improvements over omnidirectional antennas.

It is an advantage of the present invention to correct phase and optimize gain of a GPS signal away from a jammer by using the jammer signal.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
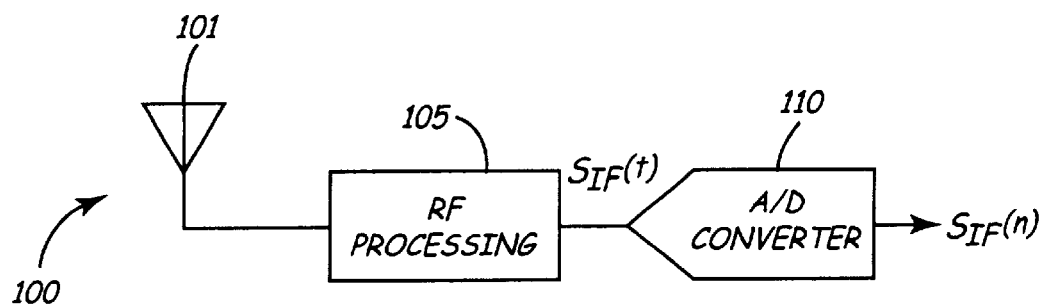
FIG. 1 is a basic block diagram of a typical GPS receiver analog front end.

The interference-aided navigation system (IANS) of the present invention provides signal acquisition and tracking by utilizing interference signals. IANS is applicable to navigation of many types of spinning vehicles. The direction and speed of rotation of the vehicle is not critical. Performance of the IANS is primarily determined by the rate of change of the rotation rate and not by absolute angular velocity. The IANS may be integrated with accelerometers in rapidly spinning vehicles such as artillery shells or with gyros or rotation rate sensors in more slowly rotating vehicles such as missiles or spacecraft. The GPS (Global Positioning System) is utilized as an example of an external navigation signal. However, the rotational tracking technique of the IANS may be applied to many different types of navigation signals such as other radio navigation signals, as well as optical, acoustic, and other types of external signals. For purposes of example, the present invention is described for the situation of a moving vehicle with one or more antennas attached in fixed positions. However, the present invention may also be applied to a fixed station with one or more movable antenna arrays. The term vehicle will then refer to the movable portions of the system. The primary requirement for application of the interference aided signal acquisition and tracking system depends on two factors: that a large directional interference or jamming signal may be present, and that the reception of this interfering signal is modulated in a way that is dependent on the rotation angle or attitude of the vehicle or one or more of its components. If no jamming signal is present, the navigation system such as GPS is able to operate in a conventional fashion.

In general, interference signals received by a rotating vehicle's antenna are of unknown or random amplitude and phase but the power of the received signal is modulated as a function of the vehicle's rotation. By correlating the power modulation of the interference signal with the expected modulation over the possible range of rotation rates, the frequency of the vehicle's rotation may be determined. Because the direction of the interference source is not generally known, the exact instantaneous phase of rotation is not initially known. However, once the rotation rate is determined, the system may systematically seek the desired navigation signal in directions relative to the interference source.

In the case of GPS, the navigation signals tend to be available from a number of different angles. Therefore, once the direction of a jammer is determined, the vehicle may search for valid GPS signals in directions generally opposite the jammer. This search may be accomplished by increasing the relative signal processing gain using analog or digital means preferably in the direction of low interference. This gain increase should generally improve the signal to noise level of the received GPS signal and permit acquisition under higher levels of interference.

FIG. 1 is a basic block diagram of a typical GPS receiver analog front end 100. A received signal from an antenna 101 is fed into a RF processing block 105 that amplifies, filters, and mixes the signal down to an IF (intermediate frequency) $S_{IF}(t)$ that can be sampled by an A/D converter 110. The A/D converter 110 typically includes an automatic gain control (AGC) loop shown in FIG. 2 to optimize the signal processing performance of a later GPS digital signal processor (not shown). The GPS analog to digital (A/D) converter 110 often incorporates some type of automatic gain control (AGC) to optimize the signal levels into a fixed-range A/D converter 111. One common technique utilizes a level detector 112 on the digital output of the fixed-range A/D 111. The level detector 112 provides a measure of the "fullness" of the A/D converter input.

An analog gain servo 113 is then utilized to drive a gain control input of a variable-gain amplifier 114 to maintain the desired signal level into the A/D converter 111. On many GPS chip sets, the AGC gain control voltage is available on an external pin. This voltage provides a convenient measure of the total signal amplitude or power. The GPS digital signal processor processes digitized GPS IF signals $S_{IF}[n]$ from the A/D converter 110 and may provide a feedback signal to help optimize the AGC gain level. The IF signal $S_{IF}[n]$ may contain interference and jamming signals as well as GPS signals.

Although any interference signal may be used to aid the determination of the rotation rate of the vehicle, interference signals passed by the RF processing block 105 are obviously of greatest concern because these signals tend to interfere with the GPS signals and cause difficulty in GPS signal acquisition. Therefore, it is logical to utilize the interference signal passed by the RF processing block 105 for aiding GPS signal acquisition.

Figure 3:
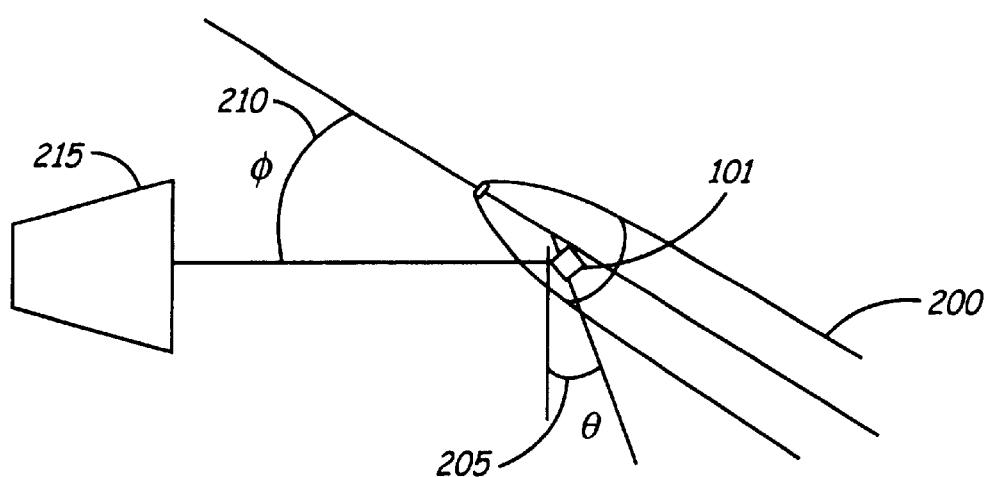
FIG. 3 is a drawing showing the location of an antenna on an artillery shell incorporating the present invention.

FIG. 3 is a drawing showing the location of the antenna 101 on an artillery shell 200 incorporating the present invention. The antenna 101 may be a simple patch antenna or other directional antenna known in the art. Also shown in FIG. 3 are the roll angle θ205 and the pitch angle φ210 relative to a jamming signal source 215 and the artillery shell 200. The artillery shell 200 is shown as an example and any spinning vehicle may be used in a similar fashion to implement the present invention.

Figure 4:
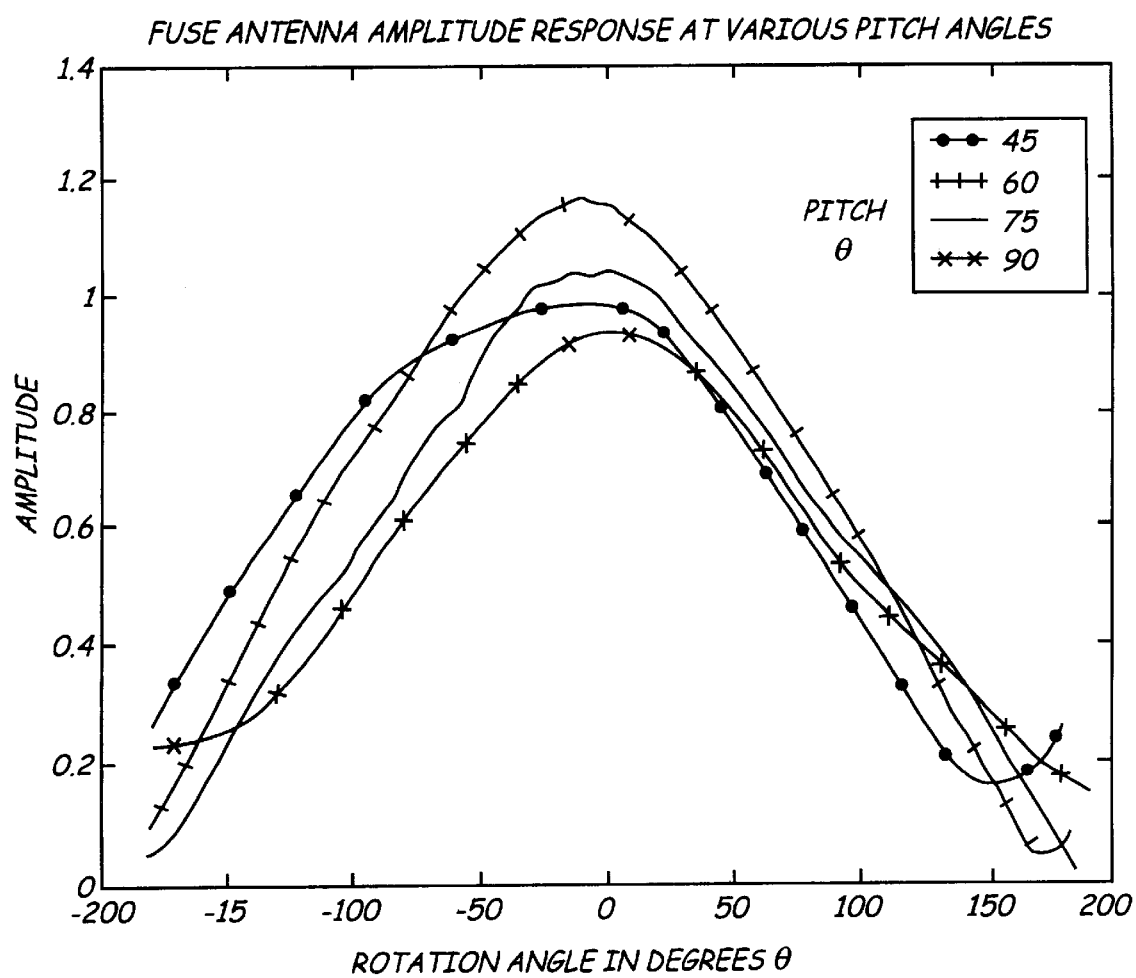
FIG. 4 is graph showing the amplitude modulation of GPS signals as received by the antenna mounted on the artillery shell of FIG. 3.

FIG. 4 is graph showing the amplitude modulation of GPS signals as received by the patch antenna 101 mounted on the artillery shell 200 of FIG. 3. In FIG. 4, the roll angle θ205 is shown on the X-axis and the Y-axis shows the relative amplitude of a received GPS signal for various pitch angles φ210. As shown in FIG. 4, there is a significant amplitude modulation versus roll angle θ205 and that the modulation is present for a wide range of pitch angles φ210. As the artillery shell 200 rotates, any signal received from the jamming or interference source 215 not on the axis of rotation is also modulated. Any interference source of concern will be of large amplitude and much greater than the GPS signal or the general background noise. The modulation of the total received signal will be dominated by the largest interference source. The modulation of the total received signal may be used to both determine rotation rate as well as the relative direction of the jamming signal source 215 with the IANS.

The interference-aided navigation system (IANS) may be embodied in several forms. Implementations may be analog or digital or a combination of both. The implementation chosen is dependent on the application requirements such as the level of performance required, the hardware complexity and acceptable cost.

Figure 5:
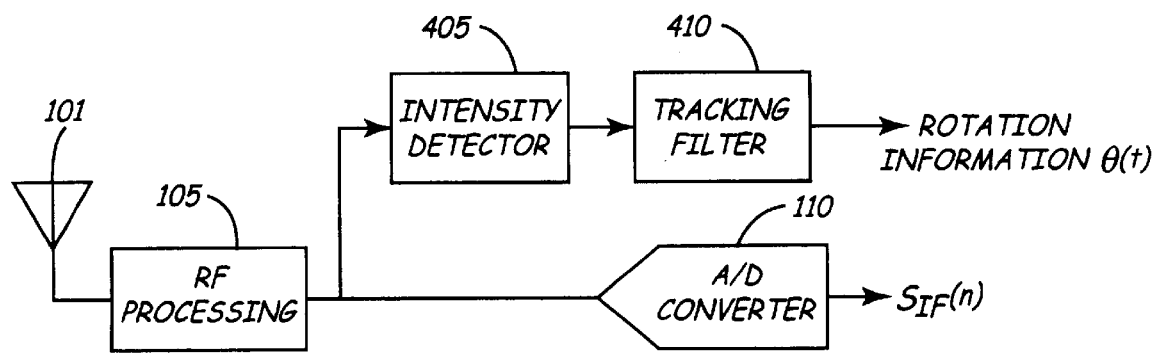
FIG. 5 is a block diagram of an implementation of the interference-aided navigation system using an interference-tracking filter with a separate intensity detector in the GPS receiver front end of FIG. 1.

FIG. 5 shows an implementation of the interference-aided navigation system (IANS) using an interference-tracking filter 410 with a separate intensity detector 405 in the GPS receiver front end 100 of FIG. 1. This design may be implemented as either an analog or a digital system. The intensity detector 405 measures the analog IF output of the RF signal processing 105 and outputs a measure of the signal intensity (or amplitude) as an analog or digital signal. The intensity detector 405 may be implemented in techniques known in the art such as a rectifier and filter or an AM (amplitude modulation) detector. The tracking filter 410 connected to the intensity detector 405 provides a rotation angle estimate θ(t).

Figure 2:
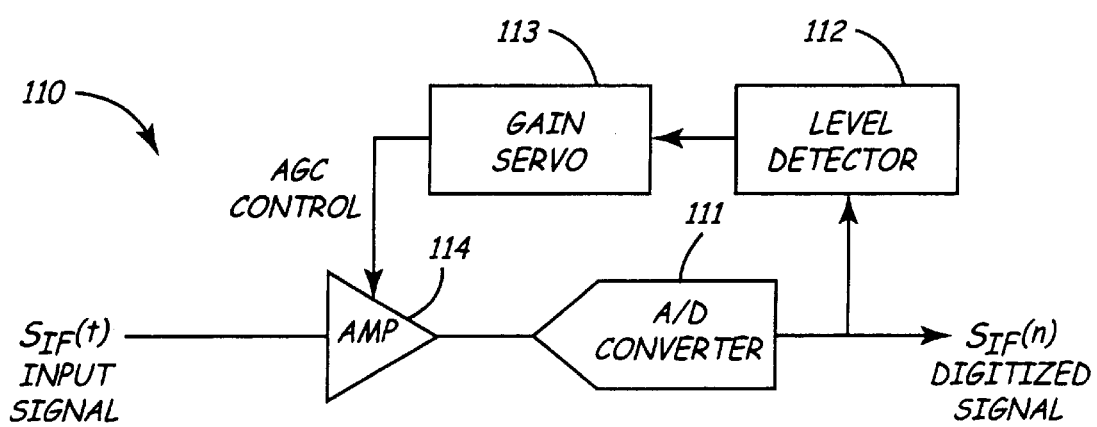
FIG. 2 is a block diagram of an AGC control loop with an A/D converter as used in the GPS receiver of FIG. 1.

The automatic gain control (AGC) loop shown in FIG. 2 may be included to optimize the gain of the A/D converter 110 of the GPS receiver front end 100. Typically the bandwidth of the AGC loop is sufficient (above one kHz) to track the variation of the interference signal with rotation of the vehicle. An AGC control signal 407 may be utilized to replace the intensity detector 405 of FIG. 5 as shown in the alternate embodiment of FIG. 6. In a rotating application, the AGC control loop tends to increase the gain when the interference signal is small and decrease the gain when the interference signal is large. This helps to improve performance by increasing signal processing gain when the signal to noise level is at a maximum.

Figure 6:
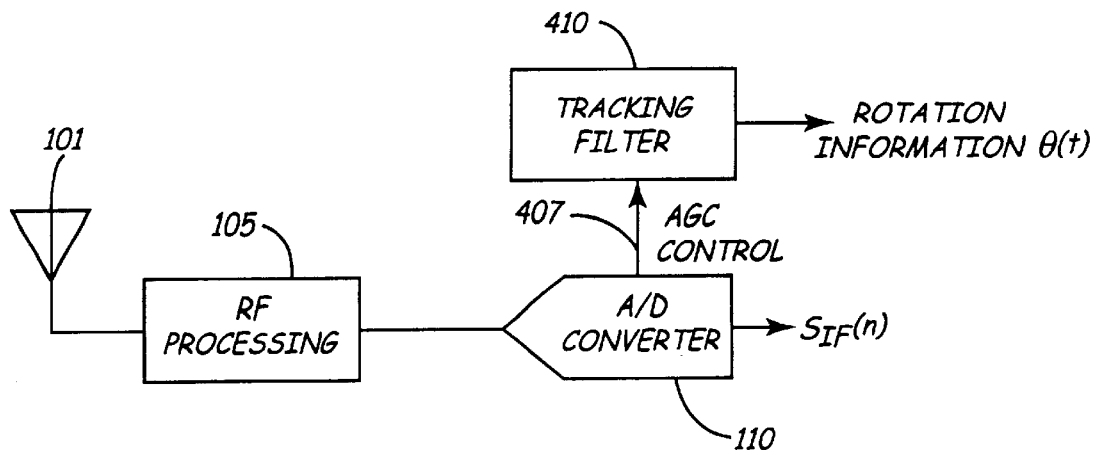
FIG. 6 is a block diagram of an alternate embodiment of the interference-aided navigation system using a control signal from the AGC loop of FIG. 2.

In FIGS. 5 and 6, tracking filter 410 may utilize the output of the intensity detector 405 or the AGC gain control signal 407 to measure the rotation rate of the vehicle. The tracking filter 410 extracts the portion of the intensity signal or AGC gain control signal 407 synchronous with rotation and provides rotation information to the GPS digital signal processor to remove rotational effects. The rotation angle estimate θ(t) output of the tracking filter 410 may be fed to a temporal beam former as discussed below in conjunction with FIG. 13 below.

The rotational angle estimate θ(t) may be used by any system requiring rotational information such as an inertial aiding system or a RF noise canceling system to improve their performance.

Figure 7:
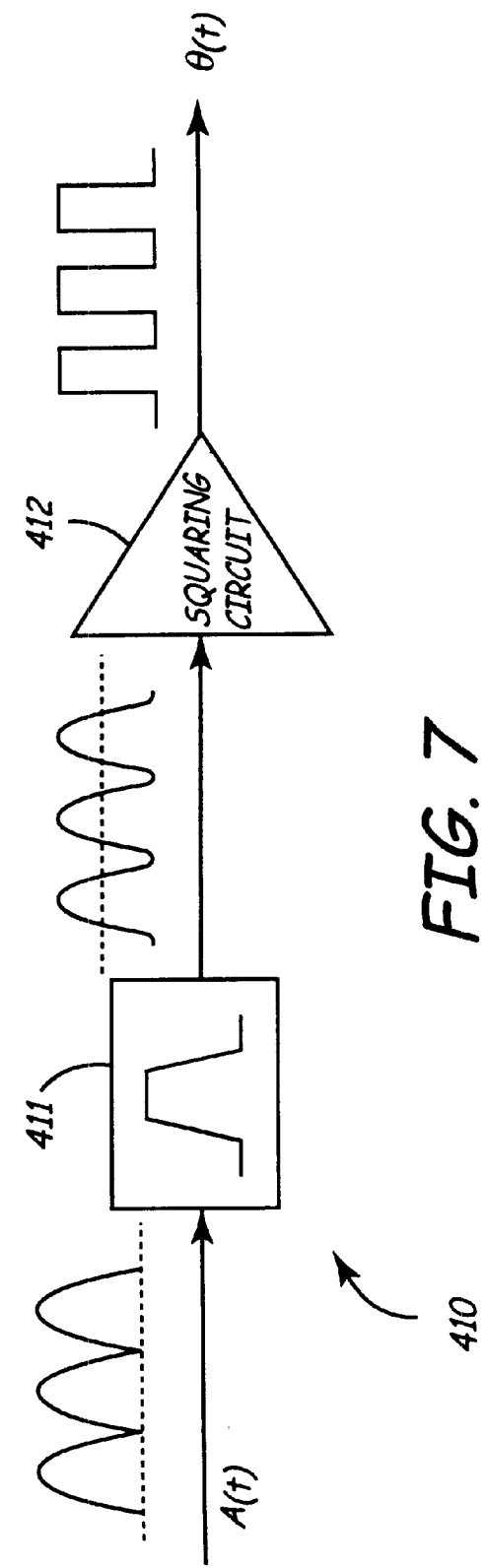
FIG. 7 is a block diagram of a simple implementation of a tracking filter of FIG. 5 and FIG. 6.

The implementation of the tracking filter 410 is dependent on the vehicle application. Performance requirements, hardware complexity limitations, as well as issues of compatibility with existing GPS receiver hardware, influence the design of the tracking filter 410. For applications in which the rotation rate is known within a very limited range, the tracking filter 410 may be a simple band-pass filter 411 to filter the AGC control signal or intensity detector 405 output and a squaring circuit 412 as shown in FIG. 7. This simple circuit implementation of the tracking filter 410 provides rotation frequency information θ(t). The band-pass filter 411 or DC block removes a DC offset from the interference amplitude input modulation signal A(t) and a squaring circuit 412 such as a comparator, produces a one-cycle per revolution square wave. Phase and duty cycle of the output is somewhat dependent on direction and amplitude of the interference signal source 215. The band-pass filter 411 may be made adaptive for improved tracking of the signal and greater dynamic range. A phase-locked-loop, tracking demodulator, or advanced FFT frequency estimation techniques, or other interpolation method may be utilized on the output to provide sub-one-revolution roll-angle information. For enhanced performance under conditions of intermittent interference, inertial data may be used to aid the tracking filter 410.

Figure 8:
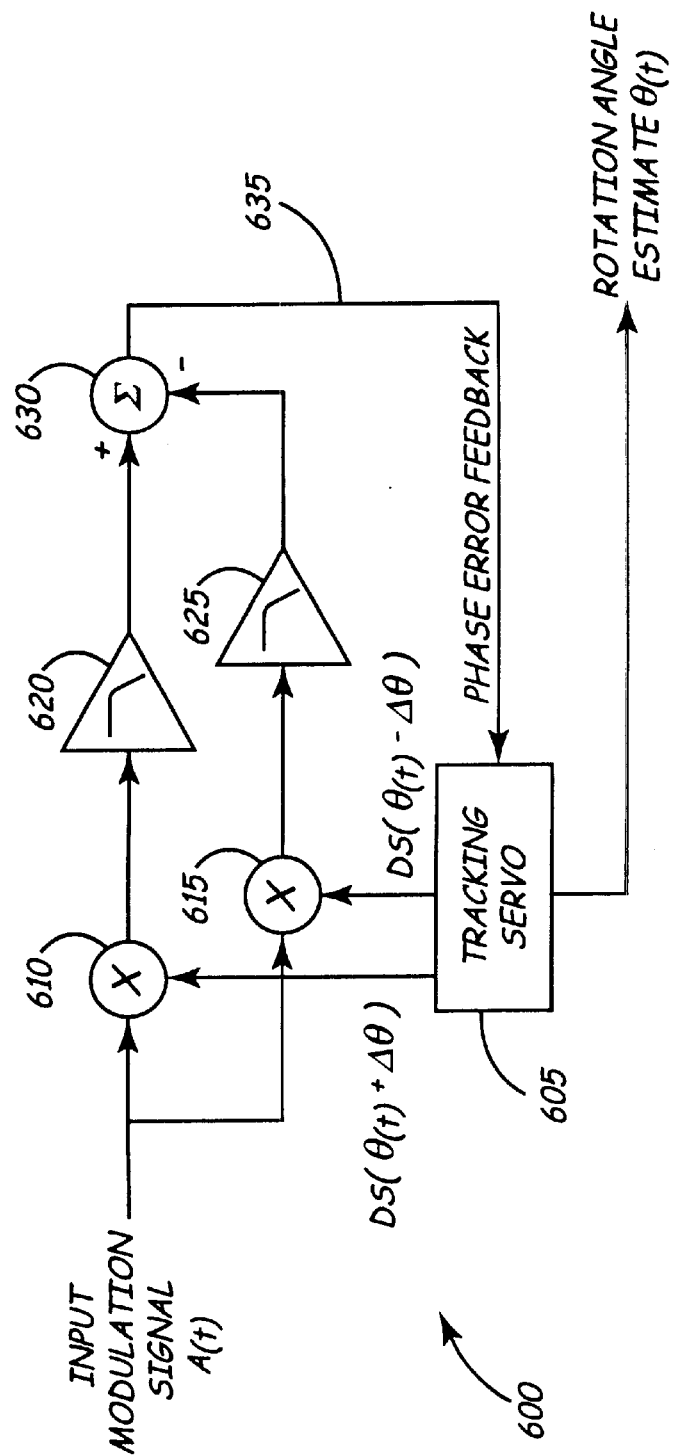
FIG. 8 is a block diagram of a basic closed-loop tracking filter that may be utilized as the tracking filter of FIGS. 5 and 6.

FIG. 8 is a block diagram of a basic closed-loop tracking filter 600 that may be utilized as the tracking filter 410. The input modulated amplitude signal A(t) from the intensity detector 405 or the AGC control signal 407 from the A/D converter 110 is mixed in mixers 610 and 615 with an advanced demodulation signal DS(θ(t)+Δθ) and a delayed demodulation signal DS(θ(t)−Δθ) respectively generated in a tracking servo 605. Mixers 610 and 615 may be implemented as simple demodulators as discussed below. Outputs of the mixers 610 and 615 are low pass filtered in filters 620 and 625 respectively. Summing network 630 subtracts the output of filter 625 from that of filter 620 to generate a phase error feedback signal 635 that is fed to the tracking servo 605. The tracking servo 605 maintains an estimate of the rotation angle θ(t) 205 relative to the interference source 215 as shown in FIG. 3. Demodulation signals DS(θ(t)+Δθ) and DS(θ(t)−Δθ) are generally a simplified model of the modulation function in relation to angle and may be advanced and delayed versions of the modulation waveform shown in FIG. 4. A good choice for the demodulation signal, that is easy to implement, is a simple on/off function.

Figure 9:
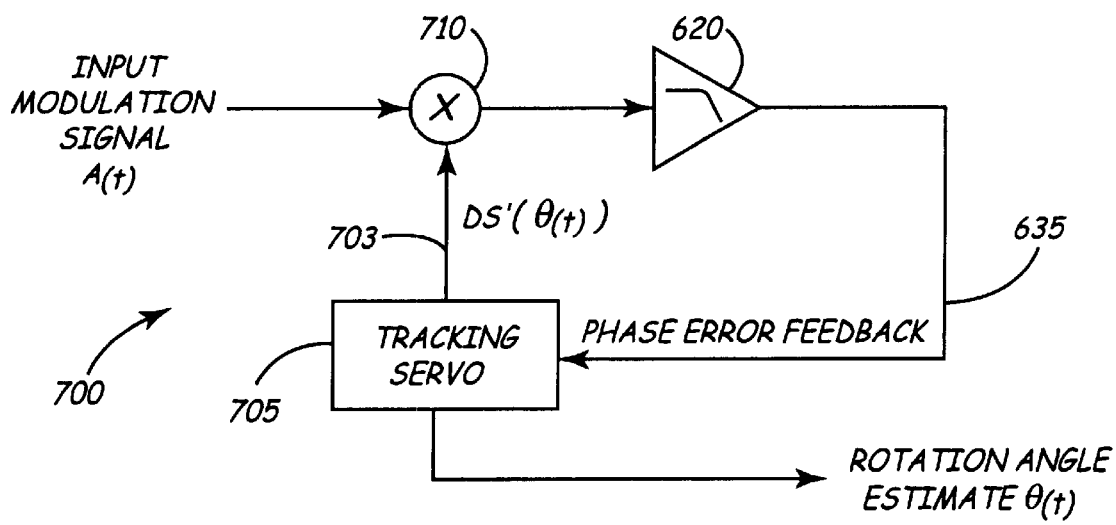
FIG. 9 is a block diagram of a tracking filter that may be implemented in simplified fashion with a single mixer stage for use as the tracking filter of FIGS. 5 and 6.

FIG. 9 shows a tracking filter 700 that may be implemented in simplified fashion with a single mixer stage 710. The demodulation mixers 610 and 615 are replaced with the single demodulator mixer 710 and a new modified demodulation signal $$DS'(\theta(t)) = DS(\theta(t)+\Delta\theta) - DS(\theta(t)-\Delta\theta).$$

DS'(θ(t)) 703 from the tracking servo 705 may be implemented with a simple +/−1 gain switch or a more complex waveform to optimize performance.

The dynamics of the tracking servos 605 and 705 of FIGS. 8 and 9 are a function of the vehicle's expected motion and the expected interference. However, in most cases, a rather simple integrator feedback or PID (proportional, integral derivative) control law is adequate once the servo 605 and 705 is locked on to the modulation signal A(t). The term locked on refers to the condition in which the tracking servo frequency estimate and the actual modulation frequency (projectile rotational rate) are close enough that the tracking servo phase error feedback can correct the errors and keep the rotation estimate θ(t) tracking the changes in the actual rotation rate.

Initially, there may be a large error in the rotation rate estimate making it difficult for the tracking servo 605 and 705 to lock. A separate acquisition mode may be required in the tracking filters 600 and 700 to acquire an initial estimate of the rotation angle. Various tracking filter acquisition techniques may be utilized that are well known in the design of phase locked loops. The need for and the design of the tracking filter acquisition mode are determined by the vehicle dynamics, the uncertainty in the rotation rate and the expected characteristics of the interference source. One common technique is to increase the initial servo bandwidth until the nominal frequency is captured and then narrow the bandwidth to improve noise. Other techniques permit a larger uncertainty in rotation frequency. Various trial and error and frequency sweeping techniques are commonly used. One rapid-acquisition technique is to measure the frequency of the modulation of the phase error feedback signal 635 with the rotation angle estimate θ(t) set at a fixed value. The frequency of the phase error signal will be directly related to the error in the rotation angle estimate θ(t).

Figure 10:
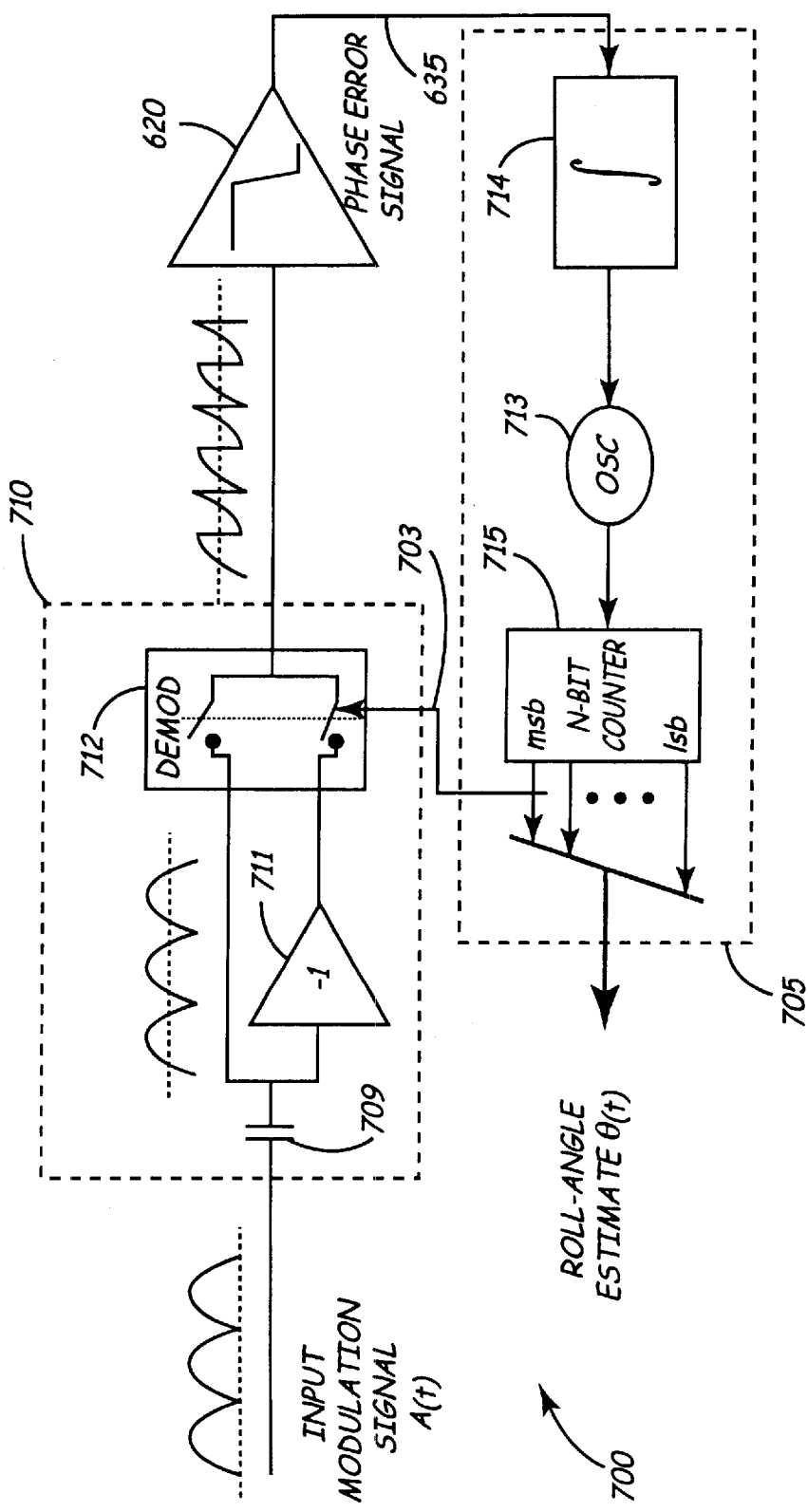
FIG. 10 is a detailed block diagram of a preferred embodiment of the tracking filter of FIG. 9.

A detailed block diagram of a preferred embodiment of the tracking filter 700 of FIG. 9 is shown in FIG. 10. This tracking filter design incorporates a phase lock loop to provide an arbitrary bit-resolution roll-angle estimate. A demodulator or mixer 710 may be implemented by a DC block 709, a simple inverter 711 and an analog switch 712. The low-pass filter 620 produces a DC signal sinusoidally dependent on the phase error between an oscillator 713 and the interference intensity of the input modulation signal A(t). A frequency servo 714 design is typical for a phase-lock-loop and may be a simple integrator or the more complex PID design. The low-pass filter 620 and frequency servo 714 design should be optimized to accommodate the expected vehicle dynamics and potential changes in the interference signal. The oscillator 713 is voltage or digitally-controlled and produces an output frequency N times the interference intensity modulation frequency. The most-significant-bit output of an N-bit counter 715 may then be used to control the demodulator 710. An acquisition technique that may used in the tracking filter of FIG. 10 is to fix the initial oscillator 713 frequency and then to measure the frequency of the phase error feedback signal 635. The frequency of the error feedback signal 635 is equal to the frequency difference between the input modulation signal A(t) and the oscillator demodulation signal DS'(θ(t)) 703 frequency (oscillator frequency divided by N). The oscillator frequency may then be updated and the frequency servo loop closed.

Figure 11:
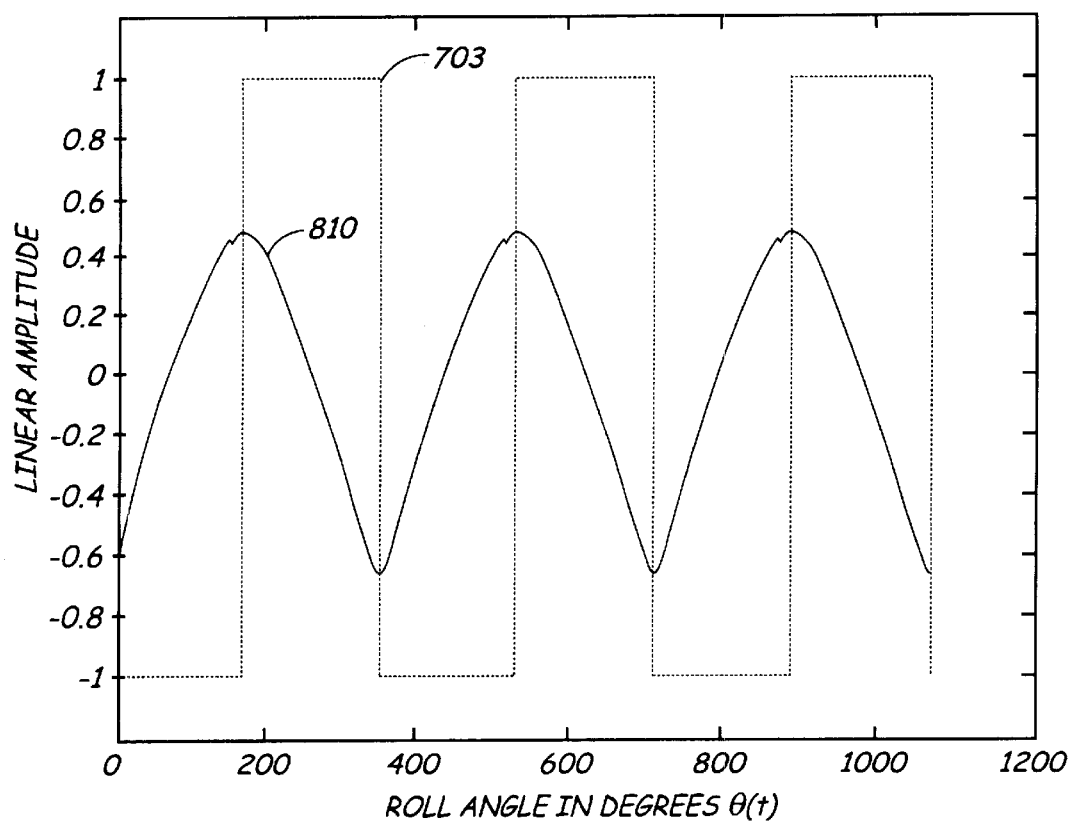
FIG. 11 shows an example square wave demodulation signal aligned with an AC coupled input modulation signal in the tracking filter of FIG. 10.
Figure 12:
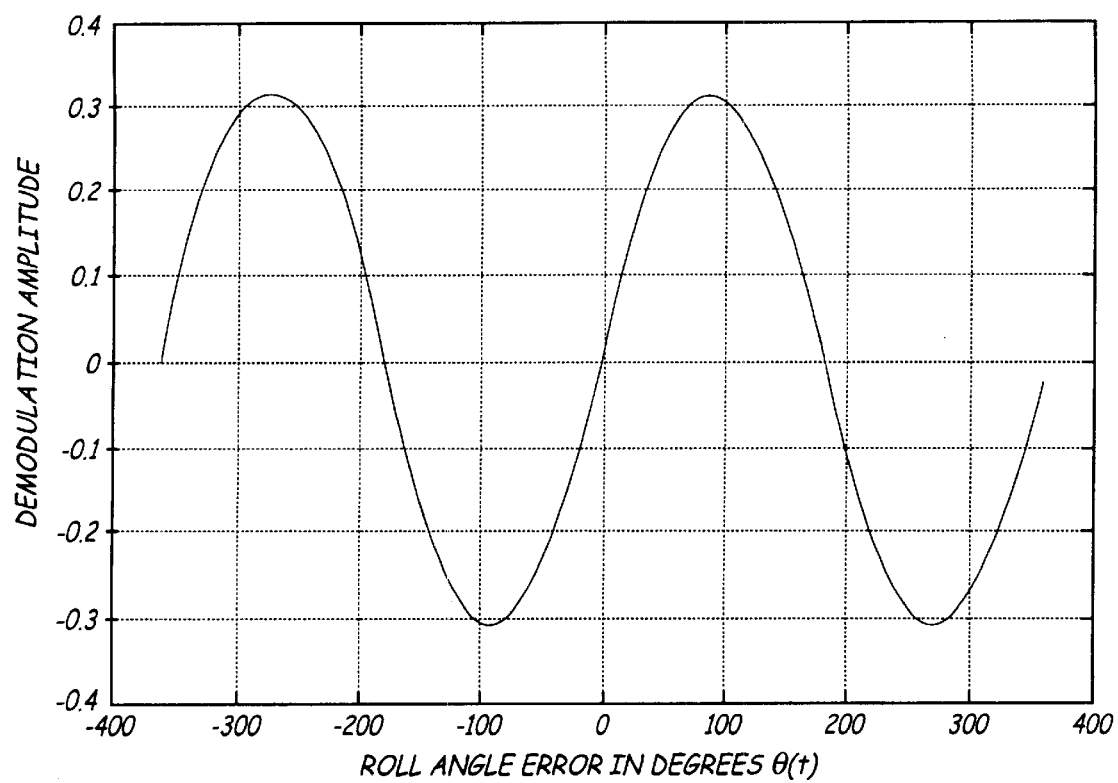
FIG. 12 shows how a demodulator phase error feedback signal changes in relation to the relative alignments of the product of the square wave demodulation signal and input modulation signal in the tracking filter of FIG. 10.

FIG. 11 shows an example square wave demodulation signal DS'(θ(t)) 703 aligned with an AC coupled input modulation signal A(t) 810. FIG. 12 shows how the demodulator phase error feedback signal 635 changes in relation to the relative alignments of the square wave demodulation signal DS'(θ(t)) 703 and input modulation signal A(t) 810 from the mixer 710 filtered by low-pass filter 620. The phase error signal 635 goes through one cycle for every 360° of relative phase shift. The frequency of the phase error feedback signal 635 is equal to the difference between the actual and estimated rotation frequencies.

Temporal beam forming (TBF) may utilize the rotation angle estimate θ(t) from the tracking filter 410 in the IANS or the GPS roll angle determination system of co-pending application Ser. No. 09/879,392 filed Jun. 12, 2001 to optimize signal gain when the antenna 101 is pointed toward a GPS signal source and away from the interference source. The GPS roll angle determination system in the co-pending application does not use the interference source for rotational angle estimation and the benefits associated with using the IANS are not received. Using IANS with TBF also provide for the removal of the phase variation of the antenna as a function of rotation, further improving the signal reception.

Figure 13:
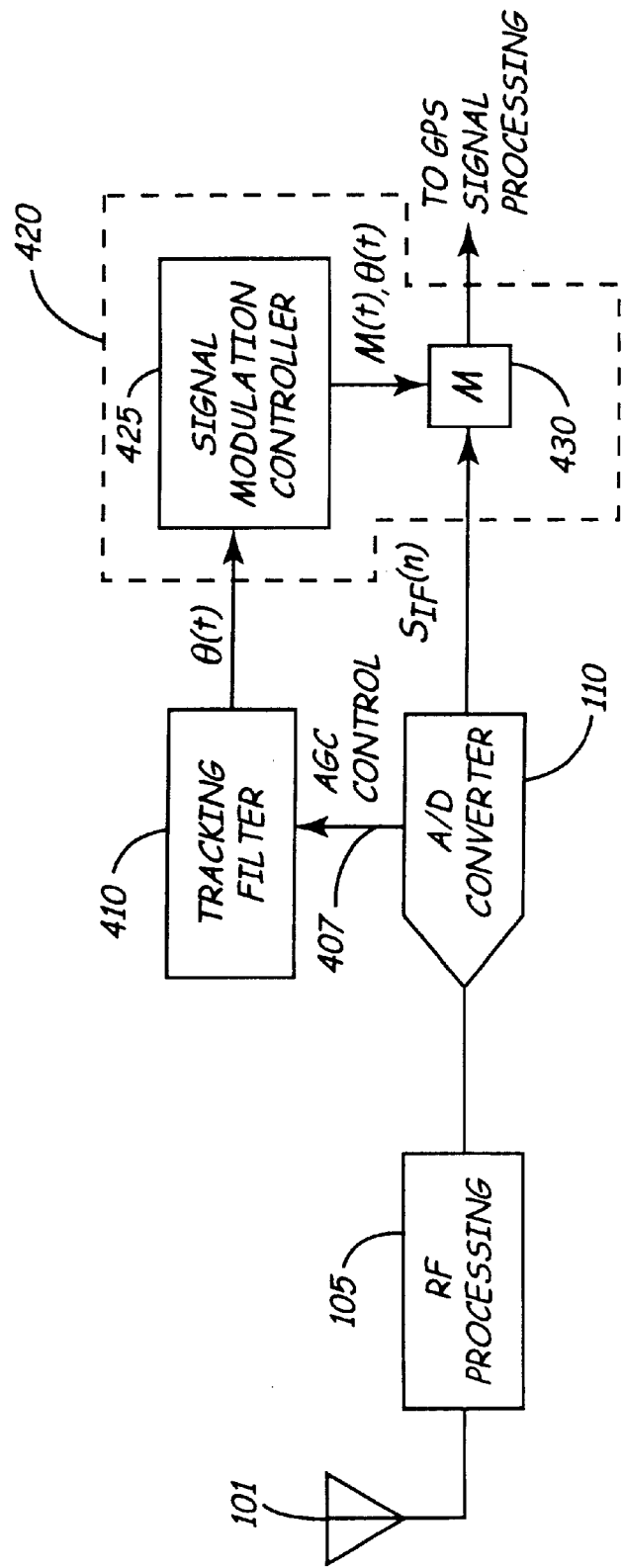
FIG. 13 is a block diagram of a signal modulation function connected to the tracking filter to form the temporal beam former of the present invention.

Shown in FIG. 13 is a signal modulation function $M(\theta)$ 420 connected to the IANS tracking filter 410 to form the temporal beam former of the present invention. The rotation angle estimate $\theta(t)$ from the tracking filter 410 is utilized to improve signal acquisition and tracking. The signal modulation function 420 comprises a signal modulation controller 425 and a gain modulation function M 430. The signal modulation controller 425 converts the rotation angle estimate from the tracking filter 410 to modulation control signals. The gain modulation function M 430 varies the A/D converter 110 output signal $S_{IF}[n]$ phase and amplitude in accordance with the modulation control signals from the modulation signal controller 425. The signal modulation function 420 increases gain when the antenna is pointed away from the signal source and decreases the gain when the antenna is pointed toward the signal source. A phase modulation function $\phi(\theta)$ is added to correct for phase modulation due to rotation.

Figure 14:
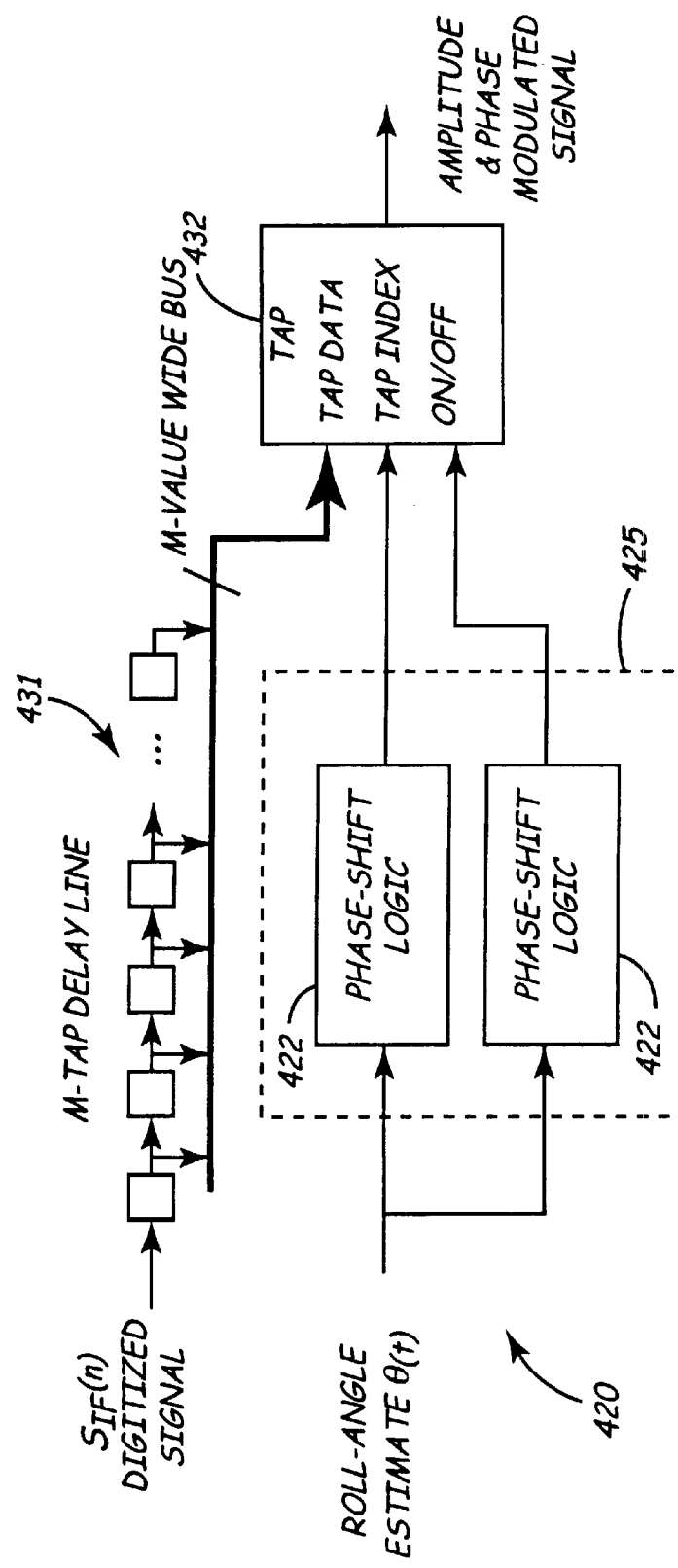
FIG. 14 is a detailed block diagram of an implementation of the signal modulation function of FIG. 13.

FIG. 14 shows an implementation of the signal modulation function $M(\theta)$ 420 in greater detail. The digitized IF signal $S_{IF}[n]$ may be phase modulated with a simple delay-line 431 or some other phase shifter known in the art. Phase-shift logic 422 specifies the proper tap to be selected from the delay line 431 and amplitude logic 421 determines if the IF signal $S_{IF}[n]$ is to be passed through or zeroed. Both the phase-shift logic 422 output and the amplitude logic 421 output are a function of the rotation angle estimate $\theta(t)$. A tap select block 432 chooses the specified value from the delay-line bus under control of the phase-shift logic 422 and transmits the data or a zero value depending on the state of an On/Off input from the amplitude logic 421.

Figure 15:
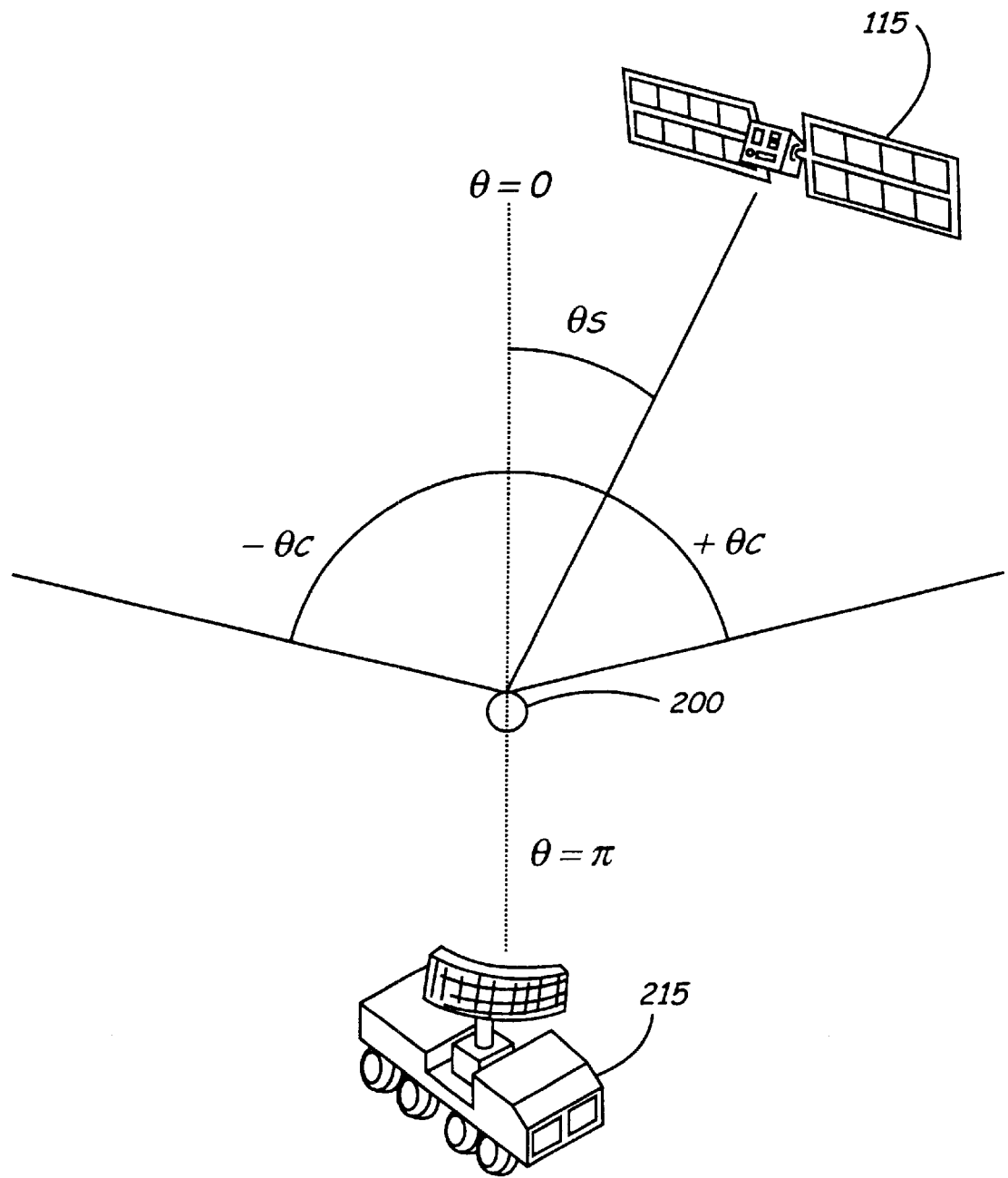
FIG. 15 is a diagram showing the angle relationships between a jammer, a GPS satellite, and an artillery shell.

In general, the phase shift of each received navigation signal depends not only on the roll angle $\theta$ relative to the interference source 215, but also on a relative phase angle to the signal source $\theta_S$ shown in FIG. 15. This relative phase angle $\theta_S$ may be estimated by adjusting the estimate for maximum signal strength. For example a servo may monitor the GPS correlation amplitudes for a given satellite and adjust the estimate of $\theta_S$ for maximum C/N₀ (signal correlation over noise). In the case of GPS signals, there are multiple navigation signals with each source having its own relative phase angle. For optimum performance, each navigation signal being tracked may be provided with its own signal modulation controller 425 and modulation function M 430. Information about the geometry of the navigation signal sources and vehicle flight path may be used to estimate the relative angles to each signal source. The overall roll angle between the interference source and the navigation constellation reference frame may be estimated by adjusting the estimate for optimum average signal strength. To reduce complexity and to accommodate navigation receiver designs to those that do not permit individual access to all the satellite signal processing channels, the number of signal modulation controllers 425 and modulation functions M 430 may be reduced. A small number or a single modulation controller 425 and modulator 430 may be used for all the navigation signals. The relative phase angle estimate may be a fixed value or may be adjusted to get the best average signal to noise performance, or to optimize the signal to noise performance of the weakest signal. The number modulators 430 utilized depends on the performance required, the phase characteristics of the antenna 101, and the hardware complexity limitations of the design.

The angle relationships relative to the artillery projectile 200 are shown in FIG. 15. A desired signal source is shown as a GPS satellite 115 and the interference signal source as a jamming vehicle 215. For purposes of discussion, the angles shown in FIG. 15 and other terms are defined below:

$\theta$—Roll angle defined relative to the direction of the largest interference source such that the interference source 215 is at an angle $\pi$, and 0 is directly opposite the interference source 215

$N_O$—Nondirectional background noise level independent of the interference source 215

$N_I$—Interference noise level amplitude from the interference source 215

$S_O$—Desired signal source 115 amplitude $\theta_S$—Angle to desired signal source 115

$\theta_c$—Beam forming cutoff angle $G_{ANT}(\theta)$—Gain of the antenna as a function of roll angle $G_{AGC}(\theta)$—Gain of the AGC loop as a function of roll angle. This is normally the inverse of the total signal amplitude $M(\theta)$—Gain modulation function added to improve signal to noise performance.

The desired signal amplitude received by the vehicle receiver is given by:

$$S(\theta) = S_O G_{ANT}(\theta - \theta_S)$$

The nondirectional noise source will contribute to the total noise weighted by the RMS antenna gain:

$$G_{RMS} = \frac{1}{2\pi} \int_{-\pi}^{\pi} G_{ANT}(\theta) \, d\theta$$

The total noise is given by the RSS (root sum square) of the directional $N_I$ and nondirectional $N_O$ noise sources (including interference) amplitude:

$$N(\theta) = \sqrt{G_{RMS}^2 N_O^2 + [N_I G_{ANT}(\theta - \pi)]^2}$$

Total signal amplitude is given by:

$$A(\theta) = \sqrt{G_{RMS}^2 N_O^2 + [N_I G_{ANT}(\theta - \pi)]^2 + S^2(\theta)}$$

The AGC loop will try to equalize the amplitude of the total input signal such that:

$$A(\theta) \cdot G_{AGC}(\theta) \cong 1 \rightarrow G_{AGC}(\theta) = 1/A(\theta)$$

To determine the average signal-to-noise level over one revolution the signal is averaged coherently and the RMS (root mean square) noise amplitude. The average signal over one revolution is given by:

$$S_{AVG} = \frac{1}{2\pi} \int_{-\pi}^{\pi} M(\theta) G_{AGC}(\theta) S(\theta) \, d\theta$$

The average noise over one revolution is given by:

$$N_{AVG} = \sqrt{\frac{1}{2\pi} \int_{-\pi}^{\pi} M^2(\theta) G_{AGC}^2(\theta) N^2(\theta) \, d\theta}$$

Average signal to noise ratio is given by:

$$SNR = S_{AVG}/N_{AVG}$$

For a given directional interference level $N_I$, omnidirectional background noise level $N_0$, and signal level $S_0$, the modulation function M(θ) 430 may be designed (within the limits of the allowed implementation complexity) to optimize the signal to noise performance. The modulation function M(θ) 430 may a simple on/off switch as shown in FIG. 14 that opens the signal path when the antenna is pointed towards the jammer for a short period of time. The modulation function M(θ) 430 may continuously follow some variable gain signal.

To obtain a better understanding of the performance of the interference-aided signal processing, the signal to noise performance of the directional system of the present invention may be compared to that of an ideal omnidirectional antenna system. For an omnidirectional antenna, the received signal is not modulated so that the AGC gain is a constant, and there is no modulation function applied. The signal to noise ratio for an ideal omnidirectional antenna is therefore given by:

$$SNR_{Omni} = S_0/\sqrt{N_0^2 + N_1^2}$$

The SNR enhancement factor $E_D$, for the directional antenna, is then given by:

$$E_D = SNR/SNR_{Omni}$$

For initial signal acquisition, the direction of the satellite 115 is not generally known a priori. However, a typical value for a satellite 115 closest to opposite the interference source may be assumed.

To simplify the implementation a simple on/off function for M(θ) 430 that is 1 for $|\theta| \leq \theta_C$ and 0 for larger angles may be used. The phase correction φ(t) may be implemented utilizing a variable delay of an integer number of clock cycles in the delay line 431 of FIG. 14. The signal to noise value for this case becomes:

$$SNR = \frac{\frac{1}{2\pi}\int_{-\theta_C}^{\theta_C} G_{AGC}(\theta)S(\theta)d\theta}{\sqrt{\frac{1}{2\pi}\int_{-\theta_C}^{\theta_C} G_{AGC}^2(\theta)N^2(\theta)d\theta}}$$

The SNR enhancement factor over an omnidirectional antenna is given by:

$$E_D = \frac{\sqrt{N_0^2 + N_1^2}\frac{1}{2\pi}\int_{-\theta_C}^{\theta_C} G_{AGC}(\theta)S(\theta)d\theta}{S_0\sqrt{\frac{1}{2\pi}\int_{-\theta_C}^{\theta_C} G_{AGC}^2(\theta)N^2(\theta)d\theta}}$$

Figure 16:
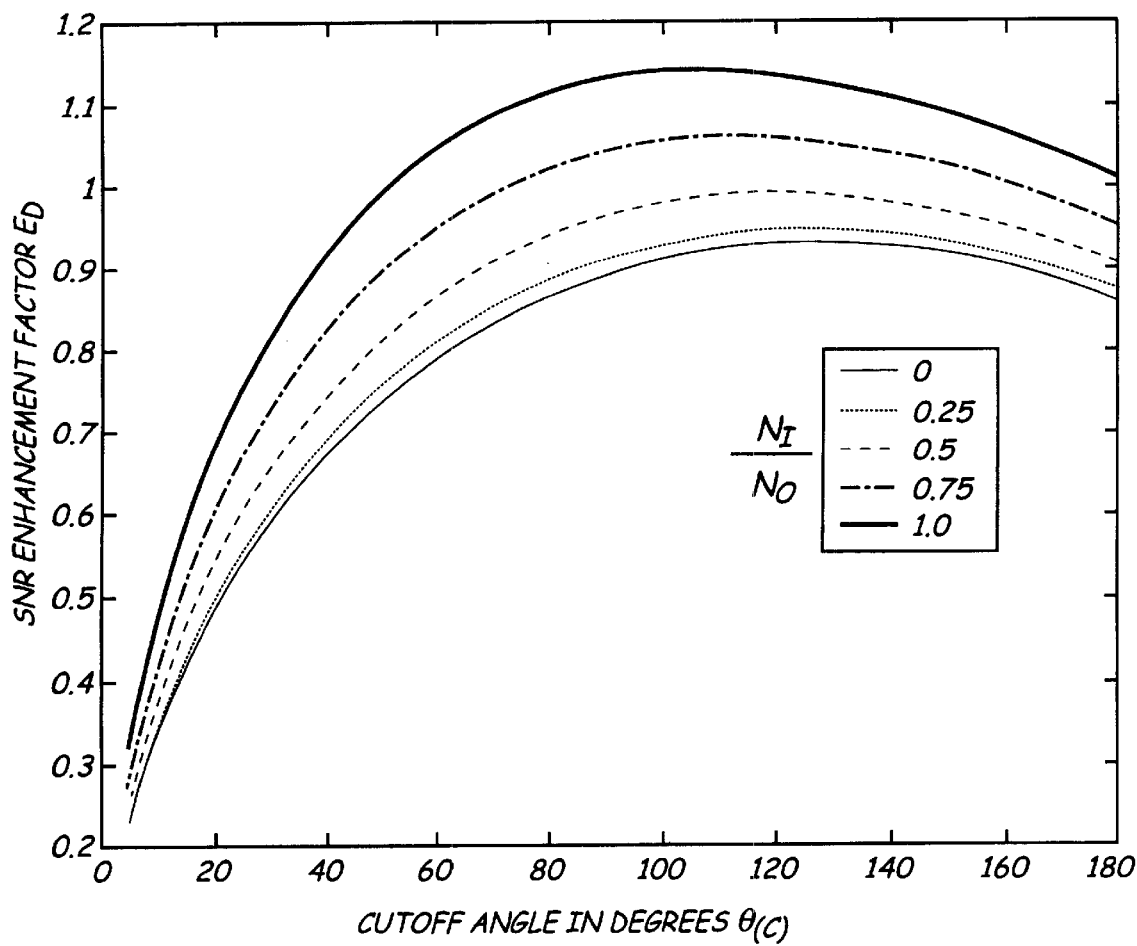
FIG. 16 shows the signal to noise ratio enhancement factor for low interference to noise ratios.
Figure 17:
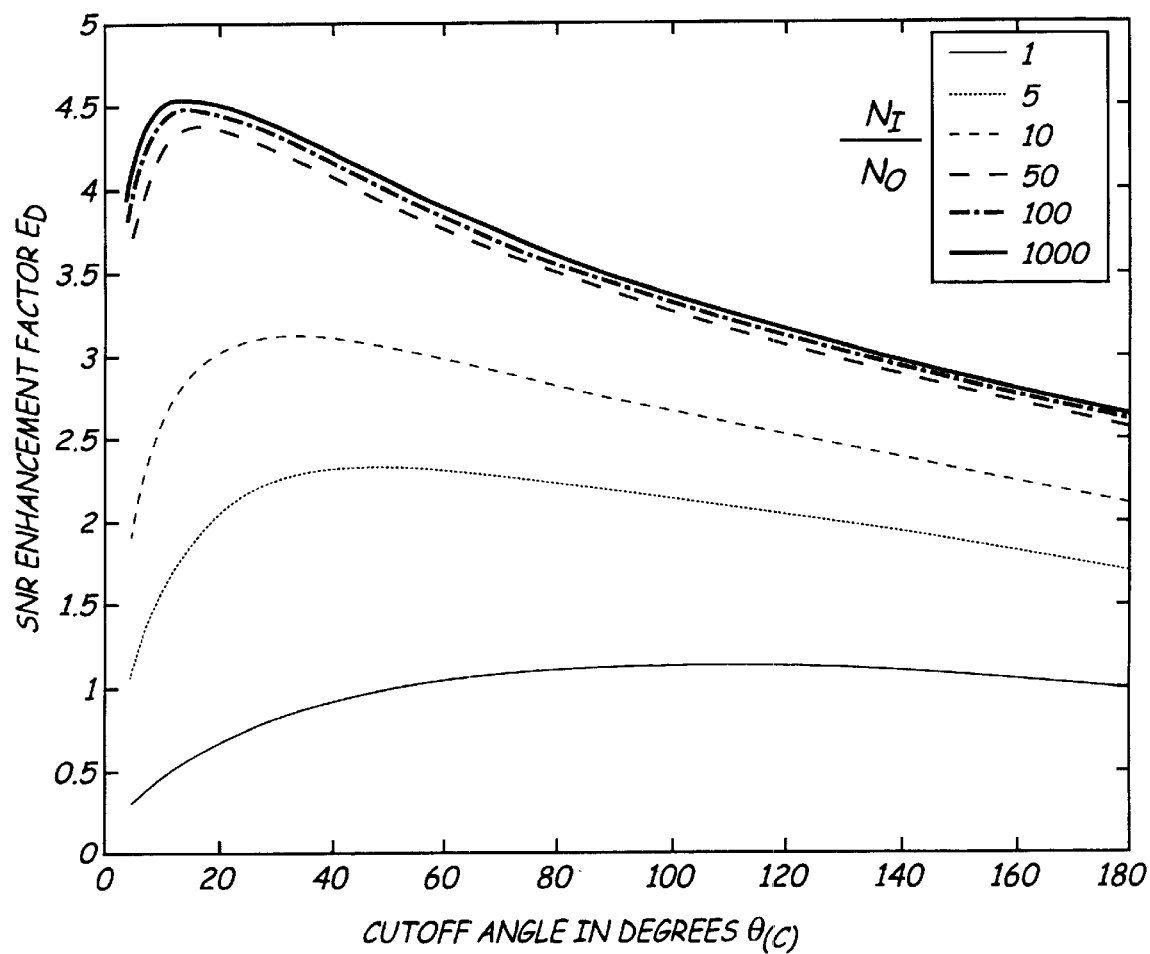
FIG. 17 show the signal to noise ratio enhancement factor for higher levels of interference to noise ratios.

FIG. 16 shows the SNR enhancement factor $E_D$ for low $N_I/N_0$ ratios with $\theta_S=0$ versus the cutoff angle $\theta_C$. FIG. 17 show the SNR enhancement factor for higher levels of $N_I/N_0$ ratios with $\theta_S=0$ versus the cutoff angle $\theta_C$. In the absence of any large directional interference source, signal to noise performance is comparable with an omnidirectional antenna SNR. However, as the level of directional interference increases the temporal beam former of the present invention using the IANS system has significantly better SNR performance than the omnidirectional antenna.

Figure 18:
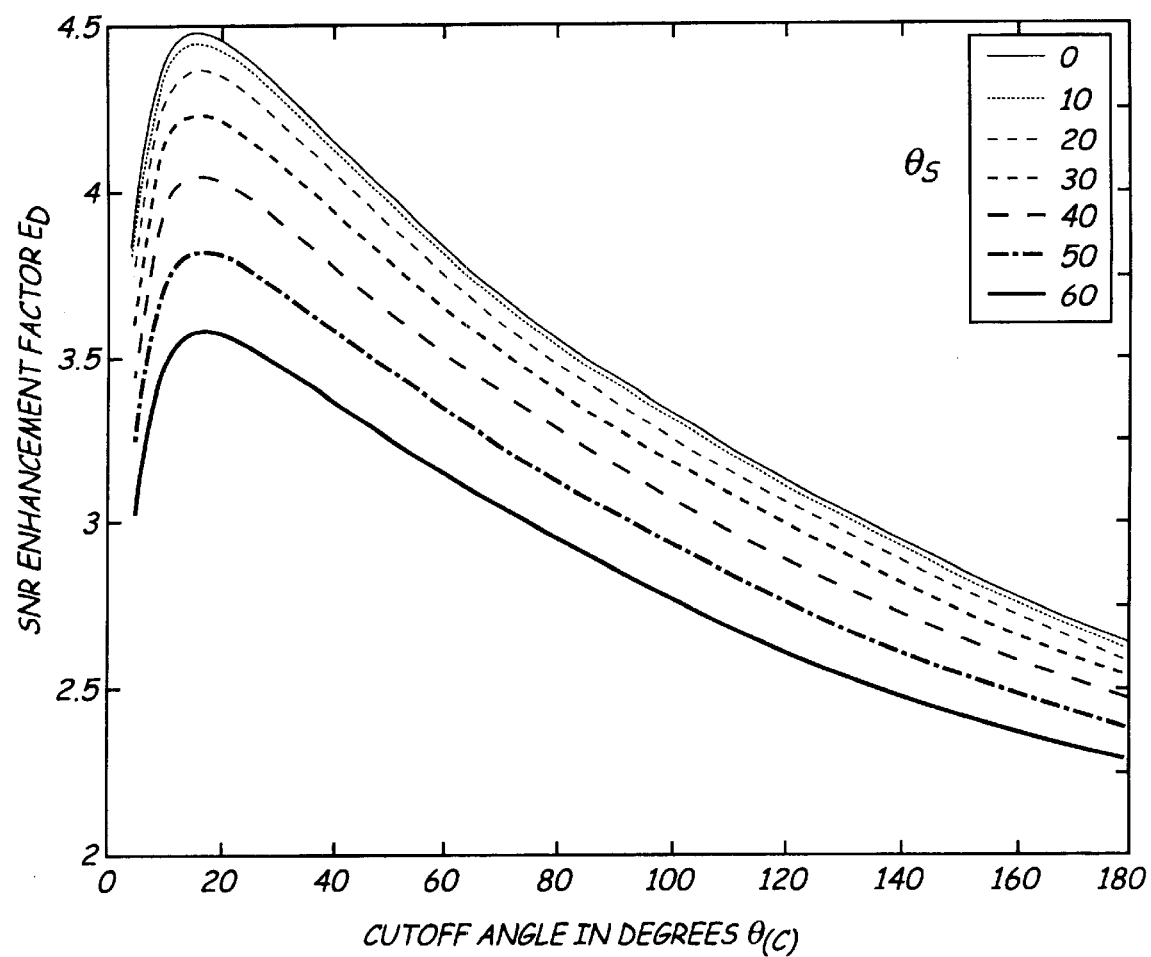
FIG. 18 shows the signal to noise ratio enhancement factor for various angles to the GPS satellite.

FIG. 18 shows the SNR enhancement factor $E_D$ for various values of $\theta_S$. In this case the satellite 115 is not directly opposite the interference source 215 or $\theta_S>0$. The enhancement factor $E_D$ is still significant for $\theta_S=\pm60°$ allowing enhanced acquisition for satellites over a wide angle.

The examples above use an antenna pattern with rather poor directivity. The signal to noise enhancement factor can be improved significantly by utilizing an antenna 101 with improved directional characteristics.

One convenient implementation is to utilize two or more antennas 101 and combine their signals to optimize the directivity of the composite result. In addition, the output of the multiple antennas 101 may be combined to provide signals over a greater portion of the rotation angle. Generally, because the signals will coherently add and the noise will combine incoherently as an RSS, the signal to noise is improved by $\sqrt{N_{Antennas}}$ where $N_{antennas}$ is the number of identical antennas 101 utilized.

Figure 19:
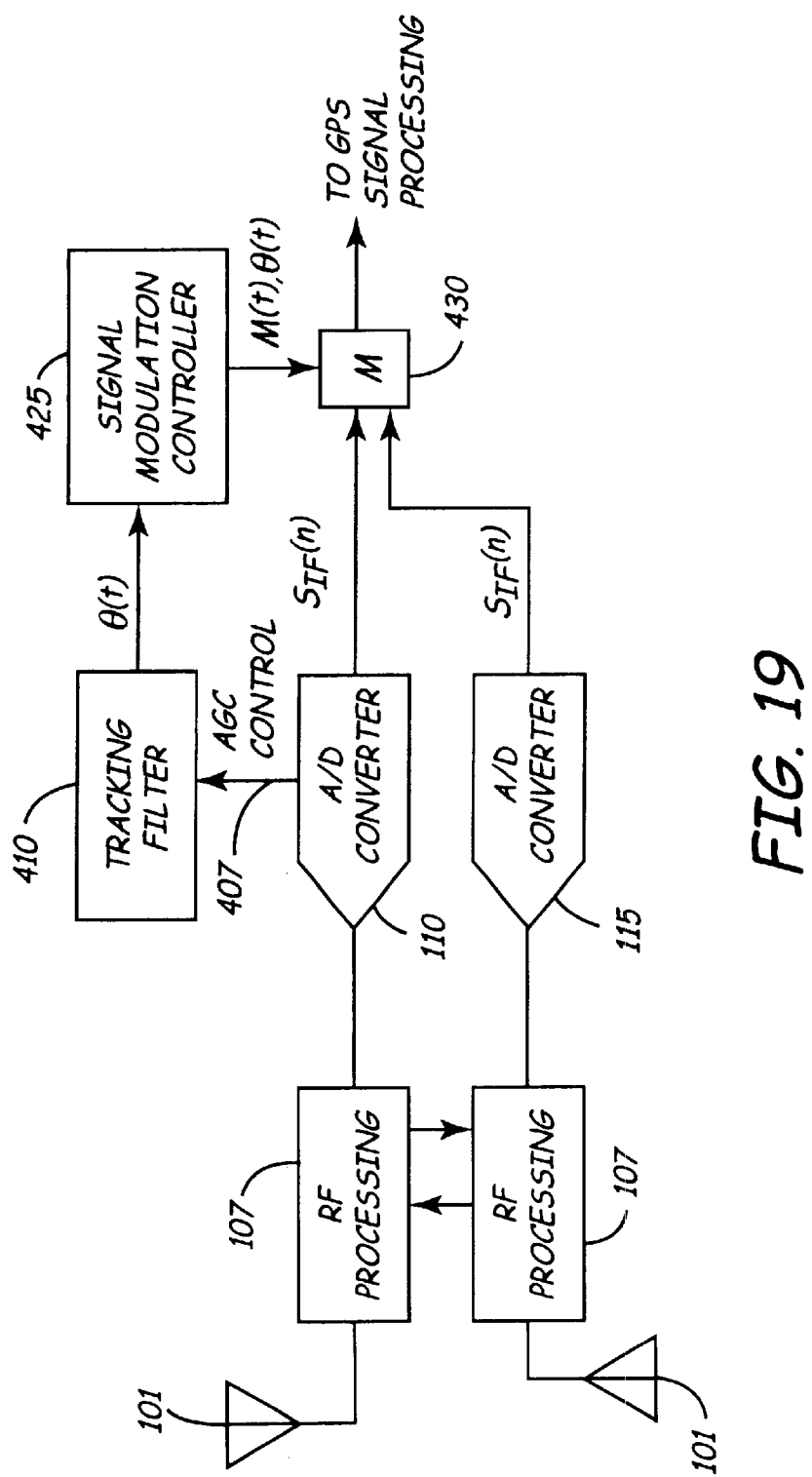
FIG. 19 is a block diagram of a two-antenna implementation with cross-feed signal cancellation between the two antenna signals.

FIG. 19 shows a simple implementation with cross-feed signal cancellation between two antenna signals as well as switching between the two digitized antenna outputs. The second identical antenna 101 is connected to a second RF processing function 107 that is identical to a first RF processing function 107. The RF processing functions 107 are similar to the RF processing function 105 with the addition of the cross-feed signal cancellation. The signal to noise will be improved by a factor of $\sqrt{2}$ by using the output of both antennas 101 and the cross-feed signal will improve the directivity of each antenna 101, further improving performance. With an antenna 101 on one side of the projectile 200 and the other antenna 101 on the opposite side or 180 degrees away, the jammer signal received by the antenna 101 opposite the jammer 215 may be subtracted from the jammer signal received by the antenna 101 directed toward the jammer 215 to further improve performance. A second A/D converter 115 digitizes the second RF processor output similar to the first A/D converter 110 but does not provide an AGC control signal to the tracking filter 410. The output of the second A/D converter 115 is also provided to the gain modulation function 430.

Figure 20:
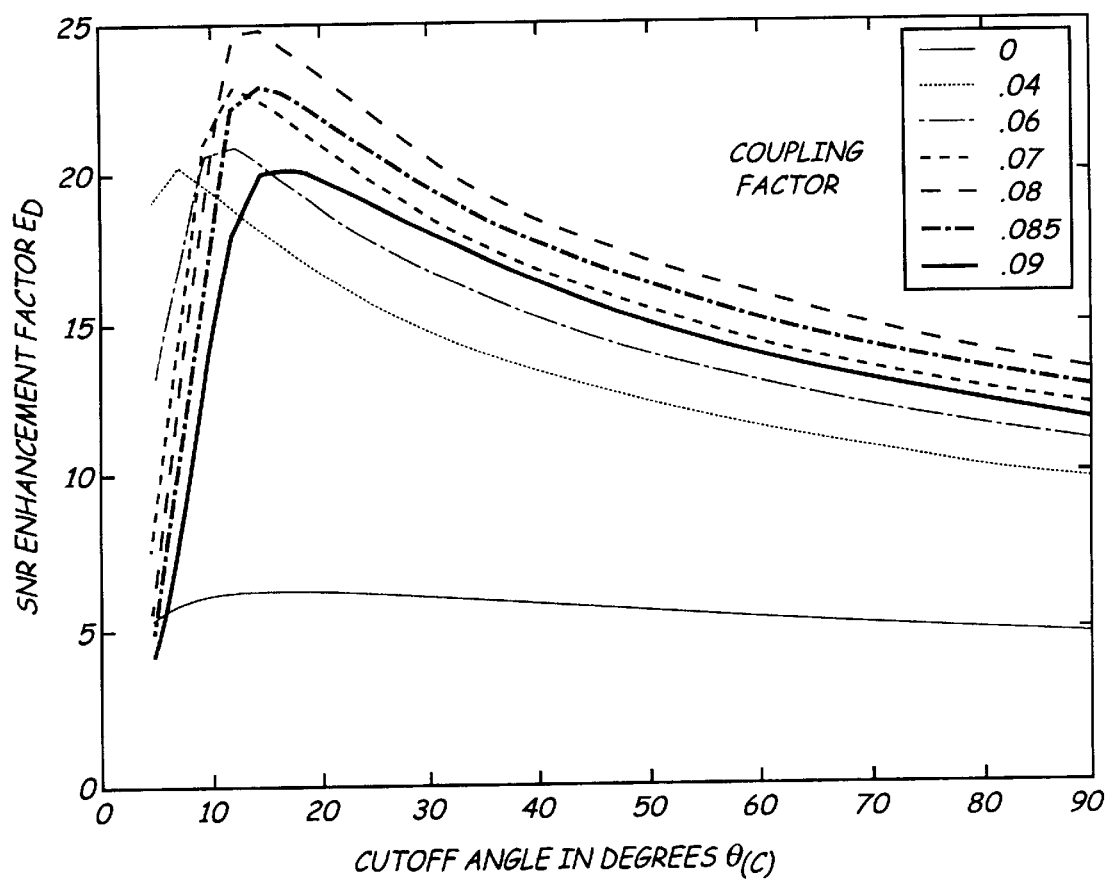
FIG. 20 shows a simulated improvement in signal to noise for the cross-feed two-antenna approach of FIG. 19.

FIG. 20 shows a simulated improvement in signal to noise ratio for the two-antenna approach of FIG. 19. The enhancement factor $E_D$ is plotted as a function of $\theta_C$ for various levels of cross-feed. Even though the directivity of each antenna is rather poor, by subtracting some fraction of the output of one antenna 101 from the other, the directivity may be optimized. Note that when no cross-feed is present (coupling factor=0), that there is sill an improvement of 3 dB ($\sqrt{2}$) because both antenna outputs are utilized for signal processing. If only one antenna output is utilized for signal processing, then the results would be similar but reduced by 3 dB.

The signal to noise improvements shown here seem quite remarkable. Obviously, the results obtained in practice will depend on a number of application and implementation details. In some applications, it may be very difficult to optimize the directivity of the antenna arrays. An active servo may be required to adjust the cross-feed terms to maintain good performance over a range of vehicle attitudes and environmental conditions. Generally there will always be a tradeoff between optimizing performance and the implementation complexity permitted by the application's size, power, and cost constraints.

It is believed that the interference aided navigation system with temporal beam forming of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An interference-aided signal acquisition and tracking system with temporal beam forming for a rotating vehicle to enhance signal to noise ratio comprising:
   an antenna for receiving interference signals and desired navigation signals;
   a RF processing function connected to the antenna to process the received interference signals and the desired navigation signals into IF signals;
   an A/D converter connected to the RF processing function to digitize the interference signals and desired navigation IF signals and to provide a digitized IF signal;
   a tracking filter for tracking amplitude variations of the interference signals and providing a rotation angle estimate signal of the rotating vehicle; and
   a signal modulation function connected to the tracking filter and the A/D converter for varying gain of the digitized IF signal to enhance the signal to noise ratio.

2. The interference-aided signal acquisition and tracking system for a rotating vehicle of claim 1 further comprising an intensity detector connected to the RF processing function and the tracking filter for determining the level of the interference signals and providing an input modulation signal to the tracking filter.

3. The interference-aided signal acquisition and tracking system for a rotating vehicle of claim 1 further comprising an AGC loop connected to the A/D converter and to the tracking filter for providing an input modulation signal to the tracking filter.

4. The interference-aided signal acquisition and tracking system for a rotating vehicle of claim 3 wherein the tracking filter further comprises:
   a band-pass filter for receiving the input modulation signal from the AGC loop and for removing a DC offset from and filtering the input modulation signal; and
   a squaring circuit connected to the band-pass filter for providing the providing the rotation angle estimate signal from the filtered input modulation signal.

5. The interference-aided signal acquisition and tracking system for a rotating vehicle of claim 3 wherein the tracking filter further comprises:
   a first mixer for receiving the input modulation signal from the AGC loop and mixing the input modulation signal with a first demodulation signal;
   a second mixer for receiving the input modulation signal from the AGC loop and mixing the input modulation signal with a second demodulation signal;
   a first filter for filtering the first mixer output signal;
   a second filter for filtering the second mixer output signal;
   a summer for subtracting the filtered signal from the first filter from the filtered signal from the second filter to form a phase error feedback signal; and
   a tracking servo for receiving the phase error feedback signal, providing the first and second demodulation signals and providing the rotation angle estimate signal.

6. The interference-aided signal acquisition and tracking system for a rotating vehicle of claim 3 wherein the tracking filter further comprises:
   a first mixer for receiving the input modulation signal from the AGC loop and mixing the input modulation signal with a modified demodulation signal;
   a first filter for filtering the first mixer output signal to provide a phase error feedback signal; and
   a tracking servo for receiving the phase error feedback signal, providing the first demodulation signals and providing the rotation angle estimate signal.

7. The interference-aided signal acquisition and tracking system for a rotating vehicle of claim 6 wherein the tracking servo further comprises:
   a frequency servo for receiving the phase error signal from the first filter and integrating the phase error signal;
   a controllable oscillator connected to the frequency servo for producing an output frequency proportional to the integrated phase error signal; and
   a counter for producing the demodulation signal and the roll angle estimate signal.

8. The interference-aided signal acquisition and tracking system for a rotating vehicle of claim 1 wherein the signal modulation function further comprises:
   a signal modulation controller for receiving the rotational angle estimate from the tracking filter and providing modulation control signals as a function of the rotation angle estimate; and
   a modulation function for receiving the modulation signals to increase gain of the digitized IF signal when the antenna is pointed toward a navigation signal source and to reduce gain of the digitized IF signal when the antenna is pointed toward an interfering signal source to enhance signal to noise ratio as a function of the rotation angle estimate.

9. The interference-aided signal acquisition and tracking system for a rotating vehicle of claim 8 wherein the signal modulation function further comprises:
   amplitude logic for providing a gain modulation signal for controlling the gain;
   a phase shifter for shifting the phase of the digitized IF signal; and
   phase-shift logic for selecting a tap on the delay to correct for phase modulation of the digitized IF signal as a function of the rotation angle estimate.

10. The interference aided signal acquisition and tracking system for a rotating vehicle of claim 1 further comprising:
    a second antenna for receiving interference signals and desired navigation signals;
    a second RF processing function connected to the second antenna to process the received interference signals and the desired navigation signals and for cross-feeding signals to the first RF processing function; and
    a second A/D converter connected to the second RF processing function to digitize the interference signals and desired navigation signals and to provide a second IF signal.

11. An interference-aided signal acquisition and tracking system with temporal beam forming for a rotating vehicle to enhance signal to noise ratio comprising:
    an antenna for receiving interference signals and desired signals;
    an RF processing function connected to the antenna to process the received interference signals and the desired signals into an IF signal;
    a tracking filter connected to the RF processing function for tracking amplitude variations of the interference signals in the IF signal and providing a rotation angle estimate signal of the rotating vehicle; and
    a signal modulation function connected to the tracking filter and the RF processing function for varying gain of the IF signal to enhance the signal to noise ratio.

12. The interference-aided signal acquisition and tracking system with temporal beam forming for a rotating vehicle of claim 11 further comprising:

an A/D converter connected to the RF processing function to digitize the IF signal; and an AGC control loop connected to the A/D converter to generate an AGC control signal for use as an input modulation signal by the tracking filter.

13. The interference-aided signal acquisition and tracking system with temporal beam forming for a rotating vehicle of claim 11 further comprising an intensity detector connected to the RF processing function for detecting the level of the IF signals and for providing an input modulation signal to the tracking filter.

14. The interference-aided signal acquisition and tracking system for a rotating vehicle of claim 11 wherein the tracking filter further comprises:

a band-pass filter for receiving the amplitude variations of the interference signals in the IF signal as an input modulation signal and for removing a DC offset from and filtering the input modulation signal; and a squaring circuit connected to the band-pass filter for providing the rotation angle estimate signal from the filtered input modulation signal.

15. The interference-aided signal acquisition and tracking system for a rotating vehicle of claim 11 wherein the tracking filter further comprises:

a first mixer for receiving the amplitude variations of the interference signals in the IF signal as an input modulation signal and mixing the input modulation signal with a first demodulation signal;

a first filter for filtering the first mixer output signal to provide a phase error feedback signal; and a tracking servo for receiving the phase error feedback signal, providing the first demodulation signal and providing the rotation angle estimate signal.

16. The interference-aided signal acquisition and tracking system for a rotating vehicle of claim 11 wherein the signal modulation function further comprises:

a signal modulation controller for receiving the rotational angle estimate from the tracking filter and providing a modulation control signal; and a gain modulation function for increasing gain when the antenna is pointed toward a navigation signal source and reducing gain when the antenna is pointed toward an interfering signal source to enhance signal to noise ratio.

17. A method of using interference signals to acquire and track desired navigation signal and to vary gain in response to interference signals in a rotating vehicle to enhance signal to noise ratio comprising the steps of:

receiving the interference signals and the desired navigation signals with an antenna;

processing the received interference signals and the desired navigation signals into IF signals;

tracking amplitude variations of the interference signals and providing a rotation angle estimate signal of the rotating vehicle; and varying the gain of the IF signal to enhance the signal to noise ratio in response to the rotation angle estimate signal.

18. The method of claim 17 for using interference signals to acquire and track desired navigation signal and to vary gain in response to interference signals in a rotating vehicle to enhance signal to noise ratio further comprising the steps of:

digitizing the IF signal; and generating an AGC control signal for use as an input modulation signal.

19. The method of claim 17 for using interference signals to acquire and track desired navigation signal and to vary gain in response to interference signals in a rotating vehicle to enhance signal to noise ratio further comprising the steps of determining the level of the interference signals and providing an input modulation signal to track the amplitude variations of the interference signals.

20. The method of claim 17 for using interference signals to acquire and track desired navigation signal and to vary gain in response to interference signals in a rotating vehicle to enhance signal to noise ratio further comprising the steps of providing an input modulation signal to track the amplitude variations of the interference signals from an.AGC control signal.

21. The method of claim 17 for using interference signals to acquire and track desired navigation signal and to vary gain in response to interference signals in a rotating vehicle to enhance signal to noise ratio wherein the step of tracking amplitude variations of the interference signal further comprises the steps of:

mixing the input modulation signal with a first demodulation signal;

filtering the mixed modulation signal to provide a phase error feedback signal; and providing the rotation angle estimate signal in response to the phase error feedback signal.

22. The method of claim 17 for using interference signals to acquire and track desired navigation signal and to vary gain in response to interference signals in a rotating vehicle to enhance signal to noise ratio wherein the step of varying the gain of the IF signal to enhance the signal to noise ratio in response to the rotation angle estimate signal further comprises the steps of:

providing a modulation control signal in response to the rotational angle estimate from the tracking filter; and increasing gain when the antenna is pointed toward a navigation signal source and reducing gain when the antenna is pointed toward an interference signal source to enhance signal to noise ratio.

* * * * *